H. H. SCHOLLMEYER.
MOTOR DRIVEN ANIMAL SKINNING KNIFE.
APPLICATION FILED APR. 15, 1921.
1,400,379.
Patented Dec. 13, 1921.
2 SHEETS—SHEET 1.
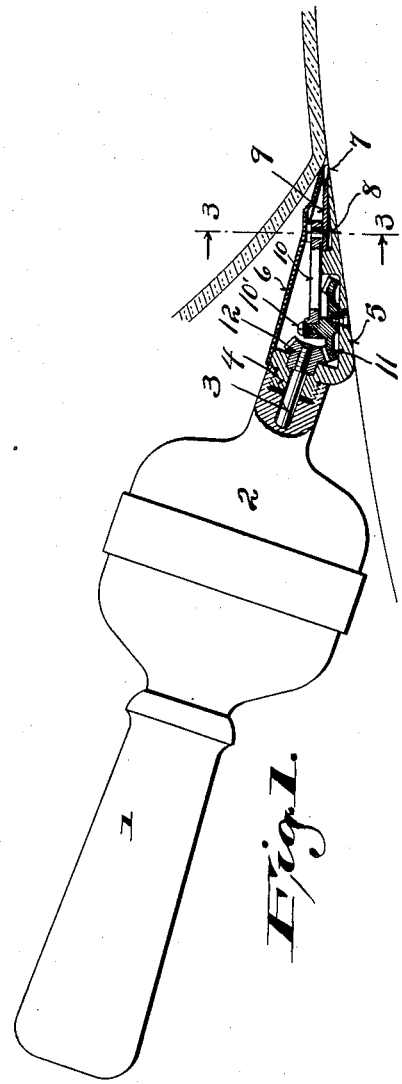
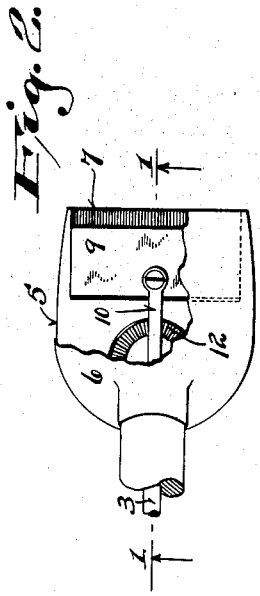
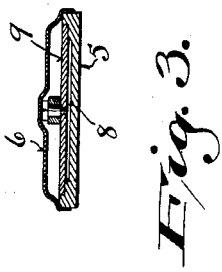
Inventor:
Herbert H. Schollmeyer

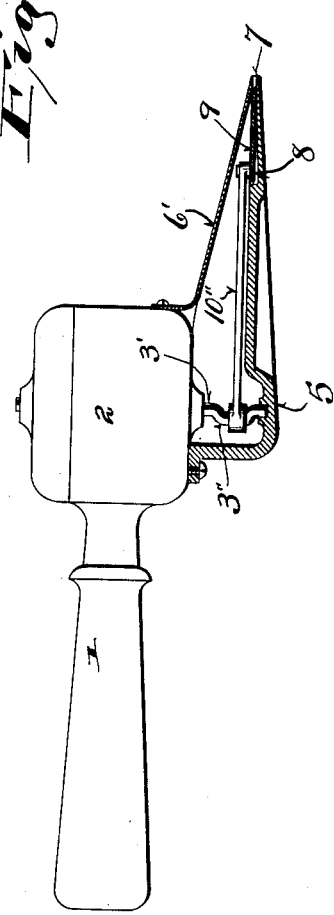

UNITED STATES PATENT OFFICE.

HERBERT H. SCHOLLMEYER, OF MILWAUKEE, WISCONSIN.

MOTOR-DRIVEN ANIMAL-SKINNING KNIFE.

1,400,379. Specification of Letters Patent. Patented Dec. 13, 1921.

Application filed April 15, 1921. Serial No. 461,718.

*To all whom it may concern:*

Be it known that I, HERBERT H. SCHOLLMEYER, a citizen of the United States, and resident of Milwaukee, in the county of Milwaukee and State of Wisconsin, have invented certain new and useful Improvements in Motor-Driven Animal-Skinning Knives; and I do hereby declare that the following is a full, clear, and exact description thereof.

My invention has for its object to provide a simple, economical and effective motor driven animal skinning knife, the same embodying essentially a hollow chisel-like head having a mouth at the converging end, through which a reciprocative blade is arranged to travel whereby the hide is separated from the flesh, as the chisel is moved forward by hand, the blade being motor driven.

With the above object in view, the invention consists in certain peculiarities of construction and combination of parts, as are hereinafter set forth with reference to the accompanying drawing and subsequently claimed.

In the drawings:

Figure 1 represents a side elevation of a skinning knife embodying the features of my invention, parts being broken away and in section to more clearly illustrate structural features, the knife being shown adjusted to an animal and positioned to remove the skin thereof.

Fig. 2 is a detail plan view of the same, with parts broken away to more clearly show structural features.

Fig. 3 is a cross section, the section being indicated by line 3—3 of Fig. 1, and Fig. 4 is a side elevation, partly in section, of another form of my invention.

Referring by characters to the drawings, 1 represents a handle having attached thereto a shell 2 incasing a motor of the electrical type not shown. As illustrated, in Fig. 1, the shaft 3 of the motor extends through a boss formed integral with the motor shell. A chisel shaped housing having a shank 4 is in threaded union with the boss through which shank the shaft 3 extends. The bottom of the housing and boss portion thereof is formed from a stamping or casting 5, and the upper portion of said housing is in the form of a sheet metal cap 6, the base portions 5 and 6 of the housing being converged at their outer edge to form a straight open mouth 7. The base portion 5 of the chisel housing is provided with a countersunk seat 8, into which is guided and fitted a blade 9 that is connected by a pitman 10 to a crank pin 10' that projects from a beveled gear wheel 11, which gear wheel is suitably journaled within a recess in the base portion 5 and is meshed with a beveled pinion 12 that is secured to the end of the motor shaft 3.

By this construction, it is obvious that when the motor is rotated, the shaft 3 will impart a reciprocative motion through its connections to the blade, whereby said blade will alternately reciprocate beyond the mouth of the chisel housing to thus separate the flesh from the hide, and as this action takes place, the operator simply moves the tool forward, whereby the hide can be quickly and effectively separated without cutting or marring either the flesh or the hide.

Fig. 4 shows another form of my invention wherein the motor shaft 3' terminates with a crank portion 3", which crank portion receives the pitman 10". The pitman in this case is connected to the blade 9 in a similar manner, previously described, in connection with Fig. 1. The base portion 5 of the housing, in this case, is secured to the motor shell and the cap portion 6' is also secured to said shell, these two parts forming a chisel shaped housing with an open mouth, through which the blade 9 vibrates to thus separate the flesh from the hide. In this form of my invention, the gear mechanism is dispensed with and the blade is reciprocated directly from the motor shaft.

I claim:

1. A skinning tool comprising a shell, a handle extending therefrom, a motor driven shaft extending through the shell, a chisel shaped housing supported by the shell about the shaft, the housing having an open mouth, a blade mounted within the housing adapted to project beyond the mouth thereof, and a driving connection between the blade and motor shaft for reciprocating said blade forwardly and backwardly in a substantially straight line.

2. A skinning tool comprising a shell, a handle extending therefrom, a motor driven shaft extending through the shell, a housing, a blade within the housing, guides for the blade and a driving connection between the blade and motor shaft for moving said blade forwardly beyond said shell and retracting said blade.

In testimony that I claim the foregoing I have hereunto set my hand at Milwaukee, in the county of Milwaukee and State of Wisconsin.

HERBERT H. SCHOLLMEYER.